Dec. 8, 1964  I. E. KNUDSEN ETAL  3,160,471
PREPARATION OF DENSE URANIUM DIOXIDE PARTICLES
Filed May 21, 1963
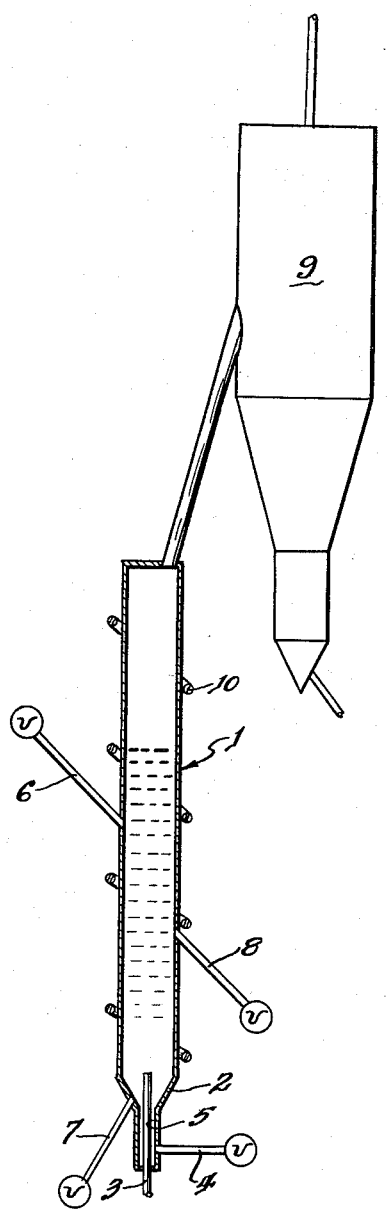
INVENTORS
Irving E. Knudsen
Albert A. Jonke
Norman M. Levitz
By: Roland A. Anderson
Attorney

3,160,471
PREPARATION OF DENSE URANIUM DIOXIDE PARTICLES

Irving E. Knudsen, Downers Grove, Albert A. Jonke, Elmhurst, and Norman M. Levitz, Bellwood, Ill., assignors to the United States of America as represented by the United States Atomic Energy Commission
Filed May 21, 1963, Ser. No. 282,179
3 Claims. (Cl. 23—14.5)

This invention relates to the preparation of dense uranium dioxide particles. In more detail the invention relates to the conversion of uranium hexafluoride to dense, smooth, roughly spherical uranium dioxide particles in a single step.

In view of its inertness, radiation stability, good retention of fission products, and high fusion point, uranium dioxide is of great interest as a reactor fuel. Enriched uranium obtained as the product of a gaseous diffusion plant is available as gaseous uranium hexafluoride. It is obviously essential therefore that uranium hexafluoride be converted to uranium dioxide for use in reactors employing enriched uranium dioxide as fuel.

It is known that uranium hexafluoride can be simultaneously reduced and hydrolyzed to uranium dioxide by hydrogen and steam in accordance with the equation:

$$UF_6(g) + 2H_2O(g) + H_2(g) \rightarrow UO_2(s) + 6HF(g)$$

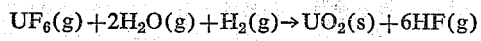

However, this reaction has not been put to commercial use and the process now in use for the conversion is a wet process which includes hydrolysis of uranium hexafluoride with water, precipitation of the uranium as the diuranate using ammonium hydroxide, filtering, drying and calcining the diuranate to $U_3O_8$, and finally reducing the $U_3O_8$ to uranium with hydrogen.

Two of the present inventors and another proposed a one-step fluidized-bed process for the conversion of uranium hexafluoride to uranium dioxide in Argonne National Laboratory Report No. ANL-6023, which is available from the Office of Technical Services, Department of Commerce, Washington, D.C. It will be noted that the density of the uranium dioxide prepared as described in the report was low. (Density obtained by xylene displacement is the skeletal density rather than over-all density since xylene penetrates the pores.) Although the low-density uranium dioxide prepared in accordance with the reported process can be sintered to high densities, it is obviously desirable to produce high-density uranium dioxide directly. The high-density product obtained by the process of the present invention is a desirable starting point even if the final density required can only be obtained by sintering, because a higher density can be obtained more cheaply by sintering particles which already have a relatively high density than by sintering low density particles. The uranium dioxide particles prepared in accordance with the present invention can therefore be used directly in dispersion-type, swaged, or vibratory-compacted fuel elements or sintered before such use.

It is accordingly an object of the present invention to develop a method of preparing dense uranium dioxide particles from uranium hexafluoride.

It is also an object of the present invention to develop a method of preparing dense uranium dioxide in a fluidized bed.

It is a further object of the present invention to develop a method of increasing the density of low-density uranium dioxide.

These and other objects of the present invention are attained by our discovery that dense uranium dioxide can be prepared by the pyrohydrolysis and reduction of uranium hexafluoride in a fluidized bed. We have found that limiting the amount of steam to near stoichiometric quantities based on the reaction

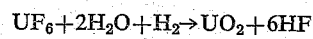

results in the production of uranium dioxide of near theoretical density. We have further found that it is necessary to feed the uranium hexafluoride to the fluidized bed intermittently to produce uranium dioxide of acceptable purity. We have also found other parameters which, although not critical, lead to optimum conditions of operation.

The invention will next be described in connection with the accompanying drawing wherein the single figure is a schematic diagram of apparatus used to practice the present invention. As shown in the drawing, a fluidized bed reactor 1 has a conical bottom 2 into the apex of which a feed inlet nozzle 3 extends. A fluidized and reactant gas inlet line 4 extends into an annulus 5 surrounding feed inlet 3. Solids recycle line 6 is disposed about halfway up the reactor 1 while a product take-off 7 is disposed at the bottom of the reactor and a sample tap 8 is located on the side of the reactor. Filter 9 is connected to the top of column 1 and the column is wrapped with electrical heaters 10.

In operation column 1 is heated to the desired temperature by heaters 10, a bed of previously formed uranium dioxide particles is established in the column, and this bed is fluidized by the introduction of hydrogen and steam through inlet line 4. Uranium hexafluoride is then introduced through nozzle 3 for the desired period of time. The hexafluoride feed is then cut off while steam and hydrogen flow is continued. Alternate periods of uranium hexafluoride feed and periods when only steam and hydrogen are fed are then continued. Product is removed semicontinuously after each cleanup period through line 7 so that the bed weight remains approximately constant. Sufficient seed particles are added through line 6 to maintain the average bed particle size within the desired limits.

In the following, a number of examples are given to illustrate the process of this invention.

TABLE I

*Preparation of High-Density Uranium Dioxide Particles From Uranium Hexafluoride in Fluidized Beds*

Equipment: 3-in.-diameter Monel column
Temperature: 650° C.
Bed Weight and Height: 6 kg; 8 to 10 in. static
Superficial Velocity: 0.75 to 1.0 ft./sec.

| Run No. | Quantity of Reactants (× Stoich)[a] | | $UF_6$ Rate (g./min.) | $UF_6$ Feed On-time (min./hr.) | Run Duration (hr.) | Residual Fluoride (w/o) | Bulk Density (g./cc.) | Particle Density[b] (g./cc.) |
|---|---|---|---|---|---|---|---|---|
| | Steam | Hydrogen | | | | | | |
| 66B | 12.6 | 12.6 | 10 | [c] 50 | 29.0 | 0.015–0.033 | 4.2 | 6.6 |
| 66C | 5.4 | 5.6 | 22 | 45 | 11.75 | 0.025 | 4.6 | 7.6 |
| 66D | 3.5 | 12.8 | 19 | 45 | 10.3 | 0.022 | 5.9 | 8.1 |
| 66F | 3.2 | 12.6 | 26 | 40 | 6.0 | 0.032 | 6.0 | 8.5 |
| 66G | 2.8 | 14.8 | 24 | 40 | 6.0 | 0.024 | 6.1 | 8.5 |
| 66E | 1.9 | 9.4 | 27 | 45 | 6.0 | 0.30 | 6.2 | 8.9 |
| 66H | 1.4 | 16.8 | 26 | 30 | 11.0 | 0.049 | 6.7 | 9.5 |
| 66K[e] | 1.30 | 16.5 | 25 | 20 | 24.0 | 0.024 | 6.3 | 9.0 |
| 66I | 1.1 | 17.8 | 25 | 30 | 6.0 | 0.043 | 6.6 | 9.3 |
| | 0.75 | 15.9 | 28 | 30 | 4.0 | 0.125 | 6.5 | 9.3 [d] 10.5 |
| 66J [c] | 0.10 | 18.8 | 26 | 30 | 10.0 | 0.104 | 5.7 | 8.4 [d] 10.7 |

[a] Based on the reaction $UF_6 + H_2 + 2H_2O \rightarrow UO_2 + 6HF$.
[b] Mercury displacement method.
[c] Intermittent feed during last 8 hrs.
[d] Xylene displacement results.
[e] Nozzle lowered.

In these examples the seed particles added were −60 +200 mesh and the average bed particle size remained near 350μ. In all runs except 66K and J nozzle 3 extended 3½ inches into the bed while in runs 66K and J nozzle 3 extended ¾ inch into the bed. It will be observed that runs 66H, 66I, and 66K were the only runs which produced uranium dioxide having a particle density of greater than 9 g./cc. Runs H, I, and K employed from 0.75 to 1.4 times the stoichiometric quantity of steam and 15 to 20 times the stoichiometric quantity of hydrogen. While the amount of steam used is critical, the amount of hydrogen is not. The only limits on the amount of hydrogen are those imposed by practical considerations. Five to 20 times the stoichiometric quantity of hydrogen is satisfactory. Inasmuch as part of the hydrogen does not enter into the reaction and is employed solely as fluidizing agent, it is expected that part of the hydrogen can be replaced with nitrogen without adversely affecting the reaction.

The amount of steam employed originally in the described and other experiments was large because steam is cheaper than hydrogen and the cheapest fluidizing agent was employed. Unexpectedly it was found, however, as illustrated in the above table, that reducing the amount of steam to within certain well-defined limits drastically increases the density of the uranium dioxide produced. These limits are shown by these and other tests to be 0.75 times the stoichiometric requirements as a lower limit and 1.40 times the stoichiometric requirements for an upper limit.

We have found that the conversion takes place primarily on the surface of the fluidized solids producing a dense layer on the particles originally present in the bed. A possible explanation for this density change is that uranium tetrafluoride, rather than uranyl fluoride and/or $U_3O_8$, is formed as an intermediate reaction product at lower steam concentrations. Some sintering densification of the particles may then occur at normal operating temperatures because of the reduced melting point of the outer layer of tetrafluoride-oxide mixture.

Sectioning the produced particles of uranium dioxide proves that the conversion takes place primarily on the surface of the fluidized solids. The dioxide forms as a dense coating on the seed particles present in the fluidized bed. As will be shown hereinafter, however, the seed particles are densified also if the fluidized bed is formed of low-density particles.

It will be observed that cleanup periods during which steam and hydrogen flow are continued but hexafluoride feed is discontinued are required. At the low steam concentrations necessary to obtain high-density uranium dioxide, complete conversion to the dioxide is not attained and the product contains a relatively high content of fluorine. The fluorine content is reduced to within acceptable levels by interrupting the hexafluoride feed while continuing the steam and hydrogen flow. It may be necessary to increase the flow of steam somewhat during these periods, particularly when below stoichiometric quantities of steam are used. As shown in the tables, a desirable division of time is to feed uranium hexafluoride continuously for thirty minutes and then interrupt the flow for thirty minutes.

The following examples illustrate the effect of bed temperature, hexafluoride feed rate, as well as duration of the feed interval, and give additional data with respect to the effect of steam concentration. In these examples sufficient seed particles, about 160μ in diameter, were added to maintain the average bed particle size between 325μ and 350μ.

TABLE II

*Preparation of High-Density Uranium Dioxide Particles From Uranium Hexafluoride in Fluidized Beds*

Equipment: 3-in.-diameter Monel column
Temperature: 650° C. except 700° C. for Run O.
Bed Weight and Height: 6 kg., 8–10 in. static
Superficial Velocity: 1.0 ft./sec. (based on inlet quantities of steam and hydrogen, and column cross section at run conditions)
Run Procedure: 30-min. hexafluoride feed, 30-min. cleanup per hour
$UF_6$ Nozzle Position: About ¾-in. penetration into bed in Runs L and M. In other runs, penetration was 3¾ in.

| Run No. | Reactant Feed Rate (× Stoich[a]) | | $UF_6$ Feed Rate (g./min.) | Run Duration (hr.) | $UO_2$ Density (g./cc.) | |
|---|---|---|---|---|---|---|
| | Steam | Hydrogen | | | Tapped Bulk | Particle[b] |
| L | 1.55 | 18.5 | 24 | 18 | 5.6 | 8.0 |
| M | 1.40 | 18.5 | 24 | 12 | 5.9 | 8.5 |
| N | 1.35 | 19.0 | 23 | 18 | 6.6 | 9.3 |
| | 1.30 | 11.9 | 34 | 6 | 6.4 | 9.1 |
| O | 1.15 | 16.7 | 26 | 21 | 7.0 | 9.7–9.8 |
| | 0.4 | 20.5 | 24 | 7 | 6.0 | 8.7 |
| Q | 1.1 | 17.5 | 25 | 12 | 6.5 | 9.2 |
| | 1.15 | 26.9 | 17 | 6 | 6.7 | 9.5 |

[a] Based on the reaction $UF_6 + 2H_2O + H_2 \rightarrow UO_2 + 6HF$.
[b] Mercury-displacement determination.

It is noted that the distance the feed nozzle extends into the bed had an appreciable effect on the density of the product. Typically run K (see Table I), made with the short nozzle, resulted in particles with a density of 9.0 g./cc. while run H, made with the longer nozzle, gave particules with a density of 9.5 g./cc. Run N was made with the longer nozzle at a steam rate similar to that of rum M (1.3 vs. 1.40 equivalents) and again higher densities were obtained with the long nozzle. This effect is as yet unexplained, although it is believed that the residence time of the particles in the nozzle area may be the cause of this difference.

In addition, particle density appears to be a function of feed rate; a higher rate (34 g./min. in run N vs. a nominal 25 g./min. in other runs) resulted in a product of lower density, whereas a reduced rate (17 g./min. vs. 25 g./min. for two portions of run Q) gave a product of higher density. This effect has not been completely investigated but it is evident from run 66I and run Q that a feed rate of between 17 and 28 g./min. gives satisfactory results.

Indications are that a change in the uranium hexafluoride on-time period does not result in a substantial density change. In order to obtain reasonable product purity the feed on-time and the cleanup time should be approximately equal. If necessary to obtain adequate cleanup, the off-time can be extended. Also the on-time should be less than an hour so that complete cleanup can be obtained in a reasonable time. If on-time extends longer than about an hour, the layer on the particles will become so thick that an unreasonably long cleanup time will be required to remove the fluorine.

Particles of any desired size can be prepared by starting with a bed of smaller particles and permitting the particles to grow to the desired size. For example, 16 to 20 mesh particles may be prepared by starting with 20 to 40 mesh particles and 80 to 100 mesh particles can be prepared by starting with 100 to 140 mesh particles.

Temperatures of at least about 650° C. should be employed. Temperatures very much lower than 650° C. result in decreased reaction speed, increased fluoride content in the product, and decreased density of the product, while a temperature of about 700° C. is about the upper limit in the equipment described. Higher temperatures could be employed in equipment formed of different materials of construction and indications are that higher temperatures would result in higher densities.

The following example illustrates how the invention can be used to increase the density of low-density uranium dioxide. The study was conducted in the same 3-inch-diameter Monel column using the same conditions of operation as in the previous examples. Run PY-72 was carried out in three periods of operation; a four-hour pretreatment with steam and hydrogen was followed by three- and five-hour periods of operation during which periods of hexafluoride feed accompanied by steam and hydrogen were alternated with periods of steam and hydrogen flow alone. The uranium hexafluoride feed rate was 25 g./min., the steam rate was 1.3 times stoichiometric and the hydrogen rate was 1.0 s.c.f.m. The superficial velocity of steam and hydrogen was 1.0 ft./sec.

The starting bed was low-density uranium dioxide (6.7 g./cc. particle density, 61 percent of theoretical density) in the size range −20 +325 mesh. No seed particles were added.

The density of the uranium dioxide increased from 6.7 to 8.6 g./cc. during the run period (12 hours.) Essentially all of this increase occurred during the hexafluoride feed periods. Screen analyses of samples taken at various times show no definite particle growth despite the deposition of about 0.71 bed equivalents of uranium dioxide.

It is believed that some interaction of the deposited material with the base particle resulting in over-all sintering and density increase has occurred. The same mechanism believed responsible as the basis for the critical steam concentration may be responsible for the interaction of the deposited material with the base particles.

An additional utility of the present invention is the recovery of HF from the stores of depleted uranium hexafluoride now being held. The procedure used, of course, is exactly the same; the only difference is that HF is the desired product and uranium dioxide is the waste product. The uranium dioxide obtained is in convenient form for storage or for use as breeding material in a nuclear reactor.

It will be understood that the invention is not to be limited to the details given herein but that it may be modified within the scope of the appended claims.

The embodiments of the invention in which an exclusive property or privilege is claimed are defined as follows:

1. A method of converting uranium hexafluoride to high-density uranium dioxide comprising establishing and maintaining a fluidized bed of uranium dioxide particles by passing between 0.75 and 1.40 times the stoichiometric requirement of steam and at least 5 times the stoichiometric requirement of hydrogen upwardly therethrough, heating the bed to a temperature of at least 650° C., and feeding uranium hexafluoride to the bottom of the bed intermittently.

2. A method according to claim 1 wherein the amount of hydrogen used is between 5 and 20 times the stoichiometric requirements, the temperature is between 650° C. and 700° C., the feed rate of uranium hexafluoride is between 17 and 28 g./min., the hexafluoride feed is on and off for approximately equal intervals of less than one hour each and the uranium hexafluoride is fed into the fluidized bed about 3¾ inches above the bottom of the bed.

3. A method of increasing the density of low density uranium dioxide particles comprising establishing and maintaining a fluidized bed of said low-density uranium dioxide particles by passing between 0.75 and 1.40 times the stoichiometric requirement of steam and at least 5 times the stoichiometric requirement of hydrogen upwardly therethrough, heating the bed to a temperature of at least 650° C., and feeding uranium hexafluoride intermittently to the bottom of the bed.

References Cited by the Examiner

Preliminary Report on Conversion of Uranium Hexafluoride to Uranium Dioxide in a One-Step Fluid Bed Process. AEC Document No. ANL 6023. August 1959.

CARL D. QUARFORTH, *Primary Examiner.*